United States Patent
Murakami et al.

(10) Patent No.: US 7,881,843 B2
(45) Date of Patent: Feb. 1, 2011

(54) OBJECT STRUCK DISCRIMINATION SYSTEM AND PROTECTION SYSTEM

(75) Inventors: Daisuke Murakami, Shiga (JP); Hiroshi Aoki, Ritto (JP)

(73) Assignee: Takata Corporation, Tokyo (JP)

( * ) Notice: Subject to any disclaimer, the term of this patent is extended or adjusted under 35 U.S.C. 154(b) by 1104 days.

(21) Appl. No.: 11/219,398

(22) Filed: Sep. 2, 2005

(65) Prior Publication Data

US 2006/0064220 A1    Mar. 23, 2006

(30) Foreign Application Priority Data

Sep. 21, 2004    (JP)    ............................ 2004-273425

(51) Int. Cl.
    *B60R 21/00*    (2006.01)
(52) U.S. Cl. .............................. 701/45; 701/46; 701/47; 293/120; 293/121; 296/187.04; 180/272; 180/274
(58) Field of Classification Search ............. 701/45–47; 293/120–121; 296/187.04; 180/274, 272
    See application file for complete search history.

(56) References Cited

U.S. PATENT DOCUMENTS

| | | | |
|---|---|---|---|
| 6,212,456 B1 | 4/2001 | Stride | |
| 6,510,914 B2 * | 1/2003 | Ishizaki et al. | ............... 180/274 |
| 6,516,278 B1 | 2/2003 | Ishizaki et al. | |
| 6,561,301 B1 * | 5/2003 | Hattori et al. | ............... 180/274 |
| 6,728,613 B2 | 4/2004 | Ishizaki et al. | |
| 6,784,792 B2 * | 8/2004 | Mattes et al. | ............... 340/436 |
| 6,832,145 B2 * | 12/2004 | Takafuji et al. | ............... 701/45 |
| 2002/0180596 A1 | 12/2002 | Mattes et al. | |
| 2004/0002815 A1 | 1/2004 | Ishizaki et al. | |
| 2004/0011582 A1 | 1/2004 | Aoki | |
| 2004/0020701 A1 | 2/2004 | Aoki | |
| 2005/0012312 A1 | 1/2005 | Roelleke | |

FOREIGN PATENT DOCUMENTS

| | | |
|---|---|---|
| GB | 2376118 | 12/2002 |
| JP | 08-230610 A | 9/1996 |
| JP | 10-194158 A | 7/1998 |
| JP | 10194158 | 7/1998 |
| JP | 2004-196239 A | 7/2004 |

\* cited by examiner

*Primary Examiner*—Khoi Tran
*Assistant Examiner*—Nikhil Sriraman
(74) *Attorney, Agent, or Firm*—Fitch, Even, Tabin & Flannery (57) ABSTRACT

An object struck discrimination system for a vehicle is provided which is effective in increasing the discrimination accuracy for discriminating an object struck by the vehicle. In one form, an object struck discrimination system to be installed in a vehicle includes an impact receiving member for receiving an impact from an object struck which extends lengthwise along the width of the vehicle, a detection sensor for detecting the moving speed or the acceleration of the impact receiving member during a vehicle collision, and a control unit for discriminating the object struck based on the rate of change in the moving speed per unit time or the acceleration introduced from information detected by the detection sensor.

17 Claims, 7 Drawing Sheets

OBJECT STRUCK DISCRIMINATION SYSTEM AND PROTECTION SYSTEM

FIELD OF THE INVENTION

The present invention relates to a technology for discriminating an object struck by a vehicle such as an automobile.

BACKGROUND OF THE INVENTION

Conventionally, various techniques for discriminating whether an object struck by a vehicle is a pedestrian or not have been proposed. For example, disclosed in Japanese Patent Unexamined Publication No. H10-194158 is an object struck discrimination system for discriminating an object struck based on the speed of a vehicle and the acceleration in the forward and rearward directions acting on the vehicle. In such object struck discrimination systems, it is highly demanded to develop a technology for increasing the discrimination accuracy for discriminating an object struck to ensure the protection of a vehicle occupant and/or a pedestrian during a vehicle collision.

SUMMARY OF THE INVENTION

The present invention has been made in view of the above demand and it is an object of the present invention to develop an object struck discrimination system for a vehicle which is effective to increase the discrimination accuracy for discriminating an object struck by the vehicle.

For achieving the object, the present invention is configured. The present invention can be adopted to a technology for discriminating an object struck during a vehicle collision for a wide variety of vehicles such as automobile, train, boat and ship.

The first form of the present invention for achieving the aforementioned object is an object struck discrimination system for discriminating an object struck by a vehicle. The object struck discrimination system described in this form is a system to be installed in a vehicle and comprises at least an impact receiving portion, a moving speed detection means, a moving speed change rate derivation means, and an object struck discrimination means.

The impact receiving portion of this invention extends lengthwise along the vehicle width at a front side or a rear side of a vehicle and has a function of receiving an impact from an object struck. Specific examples of this impact receiving portion include a front bumper cover or a rear bumper cover having low rigidity which is disposed on an outer peripheral portion of the vehicle, and an impact receiving member having high rigidity which is disposed between the bumper cover and a bumper frame. The impact receiving portion moves toward the inside of the vehicle while being deformed by the impact during the vehicle collision.

The moving speed detection means of this invention is a means having a function of detecting the moving speed of the impact receiving portion during a vehicle collision. Typically, the moving speed detection means is composed of a speed detection sensor attached to the impact receiving portion. By the moving speed detection means, the moving speed of the impact receiving portion which moves toward the inside of the vehicle while being deformed during the vehicle collision is detected. Therefore, the moving speed of the impact receiving portion corresponds to the deformation speed of the impact receiving portion.

The moving speed change rate derivation means of this invention is a means having a function of deriving a rate-of-change in the moving speed per unit time of the impact receiving portion based on the information detected by the moving speed detection means. Typically, the moving speed change rate derivation means is composed of a processing unit for conducting arithmetic processing based on signals from the speed detection sensor. By this moving speed change rate derivation means, the rate-of-change in the moving speed per unit time of the impact receiving portion during the vehicle collision is derived.

The object struck discrimination means of this invention is a means having a function of discriminating the object struck based on the rate-of-change in the moving speed per unit time derived by said moving speed change rate derivation means. By the object struck discrimination means, it is possible to discriminate whether the object struck is, for example, a person (a pedestrian) or a thing (a guardrail, an electric pole, or a vehicle). As a specific example of the mode of "discriminating an object struck", a mode of discriminating whether the object struck is a person (a pedestrian) or not based on the rate-of-change in the moving speed per unit time of the impact receiving portion can be employed. In this case, it is structured to determine that the object struck is something other than person when it is discriminated that the object struck is not a person. That is, actual discrimination of the object struck is conducted according to the discrimination of whether the object struck is a person or not.

Generally, when a vehicle collides with an object struck, abnormal acceleration which is never generated during normal driving is generated. In this case, there is a marked difference in the rate-of-change in the moving speed per unit time of the impact receiving portion between a case that the object struck is a person and a case that the object struck is a thing. For example, when the vehicle strikes a person, the rate-of-change in the moving speed per unit time of the impact receiving portion is smaller than that in case of a fixed thing or a heavy thing because the mass of the person is significantly smaller than that of the fixed thing such as a guardrail or the heavy thing. Therefore, in the present invention, it is structured to discriminate the object struck based on the rate-of-change in the moving speed per unit time of the impact receiving portion among the respective parts of the vehicle, wherein the impact receiving portion receives directly the impact during the vehicle collision at its wide area along the vehicle width. It is preferable to set and store a rate-of-change in the moving speed per unit time in a vehicle collision test or a vehicle collision simulation with an article as an imitation of an object struck and to use the rate-of-change in the moving speed per unit time as the reference for discrimination of an object struck. According to this structure, the object struck is discriminated based on the behavior of the impact receiving portion during the vehicle collision so that the discrimination accuracy for discriminating the object struck can be increased regardless of the position striking the object on the impact receiving portion.

The second form of the present invention for achieving the aforementioned object is an object struck discrimination system for discriminating an object struck by a vehicle. The object struck discrimination system described in this form is a system to be installed in a vehicle and comprises at least an impact receiving portion, an acceleration detection means, and an object struck discrimination means.

The impact receiving portion of this invention has the same structure as the impact receiving portion described previously, that is, extends lengthwise along the vehicle width at a front side or a rear side of a vehicle and has a function of receiving an impact from an object struck.

The acceleration detection means of this invention is a means having a function of detecting the acceleration of the impact receiving portion during a vehicle collision. Typically, the acceleration detection means is composed of an acceleration detection sensor attached to the impact receiving portion. By the acceleration detection means, the acceleration of the impact receiving portion which moves toward the inside of the vehicle while being deformed during the vehicle collision is detected.

The object struck discrimination means of this invention is a means having a function of discriminating the object struck based on the information detected by the acceleration detection means. By the object struck discrimination means, it is possible to discriminate whether the object struck is, for example, a person (a pedestrian) or a thing (a guardrail, an electric pole, or a vehicle). As a specific example of the mode of "discriminating an object struck", a mode of discriminating whether the object struck is a person (a pedestrian) or not based on the acceleration of the impact receiving portion can be employed. In this case, it is structured to determine that the object struck is something other than person when it is discriminated that the object struck is not a person. That is, actual discrimination of the object struck is conducted according to the discrimination of whether the object struck is a person or not.

Generally, when a vehicle collides with an object struck, abnormal acceleration which is never generated during normal driving is generated. In this case, there is a marked difference in the acceleration of the impact receiving portion detected by the acceleration detection means between a case that the object struck is a person and a case that the object struck is a thing. Therefore, in the present invention, it is structured to discriminate the object struck based on the acceleration of the impact receiving portion among the respective parts of the vehicle, wherein the impact receiving portion receives directly the impact during the vehicle collision at its wide area along the vehicle width. It is preferable to set and store acceleration by conducting a vehicle collision test or a vehicle collision simulation with an article as an imitation of an object struck and to use the acceleration as the reference for discrimination of an object struck. According to this structure, the object struck is discriminated based on the behavior of the impact receiving portion during the vehicle collision so that the discrimination accuracy for discriminating the object struck can be increased regardless of the position striking the object on the impact receiving portion. Since the acceleration detected by the acceleration detection means is directly used for discrimination of the object struck, this structure can exhibit a working effect of simplifying a series of processes from the detection of behavior of the impact receiving portion to discrimination of the object struck.

The third form of the present invention for achieving the aforementioned object is an object struck discrimination system. In the object struck discrimination system described in this form, the object struck discrimination means described previously is structured to discriminate that the object struck is a person when the rate-of-change in the moving speed per unit time derived by the moving speed change rate derivation means or the acceleration detected by the acceleration detection means becomes the maximum before the reference elapsed time has elapsed from the occurrence of the vehicle collision. The reference elapsed time may be defined as a time period elapsing until the rate-of-change in the moving speed per unit time or the acceleration of the impact receiving portion becomes the maximum in a vehicle collision test conducted with an imitated human body as the object struck or may be previously set based on information other than the vehicle collision test (information obtained from, for example, collision simulation). When the rate-of-change in the moving speed per unit time or the acceleration obtained during the actual vehicle collision becomes the maximum before the reference elapsed time has elapsed, the object struck is discriminated as a person. This structure can increase the discrimination accuracy for discriminating that the object struck is a person and achieves the quick discrimination of an object struck within a time period shorter than the reference elapsed time. The result of the discrimination can be used for controlling the protection for a person (pedestrian).

The fourth form of the present invention for achieving the aforementioned object is an object struck discrimination system. In the object struck discrimination system described in this form, the reference elapsed time described previously is defined as a time period elapsing between the occurrence of the vehicle collision and a time when the moving speed of an imitated human body becomes the maximum in a vehicle collision test previously conducted with the imitated human body (that is, a doll known as "dummy"). This structure can increase the reliability of discriminating that the object struck is a person by using the reference elapsed time derived from the vehicle collision test.

The fifth form of the present invention for achieving the aforementioned object is an object struck discrimination system. In the object struck discrimination system described in this form, the impact receiving portion described previously is composed of an impact receiving member having high rigidity which extends lengthwise along the vehicle width. According to this structure, since the impact received by the impact receiving member having high rigidity during the vehicle collision acts substantially uniformly on the entire impact receiving member, the discrimination accuracy for discriminating the object struck can be increased regardless of the position striking the object on the impact receiving portion extending in the vehicle width direction.

The sixth form of the present invention for achieving the aforementioned object is an object struck discrimination system. In the object struck discrimination system described in this form, the impact receiving portion described previously has an absorbing member provided on an outer side beyond the impact receiving member. This structure includes an embodiment in which an absorbing member is provided on a front side beyond the impact receiving member when the impact receiving portion is arranged on the front side of the vehicle and an embodiment in which an absorbing member is provided on a rear side beyond the impact receiving member when the impact receiving portion is arranged on the rear side of the vehicle. By the absorbing member, the impact to be received by the vehicle is dispersed so as to act substantially uniformly on the entire impact receiving member. Therefore, the vehicle collision can securely reflect to the behavior of the impact receiving member, thereby further increasing the discrimination accuracy for discriminating the object struck.

The seventh from of the present invention for achieving the aforementioned object is a protection system. The protection system described in this form is systems which are actuated in the event of a vehicle collision to protect a vehicle occupant and/or a pedestrian to ensure the safety of the vehicle occupant and/or the pedestrian. In the present invention, the protection system is actuated according to the result of discrimination of an object struck by an object struck discrimination system as previously has been described. For example, when it is determined that the object struck is a person (pedestrian), the protection system is actuated to protect the occupant and the pedestrian. The "protection system" includes airbag devices installed in a steering wheel in front of a driver's seat, an instrument panel in front of a passenger's seat, a door trim, a seat, and/or a pillar, and a pretensioner for applying predetermined tension to a seat belt for the purpose of protecting vehicle occupants, and a device for lifting a vehicle hood upward, a device for making a protection pad member or an airbag to act on a pedestrian, and the like for the purpose of protecting the pedestrian.

According to the aforementioned structure, the protection system is actuated with high discrimination accuracy for discriminating an object struck at the event of a vehicle collision, thereby providing thorough protection of the person and the pedestrian.

As described in the above, the present invention can achieve an effective technique of increasing the discrimination accuracy for discriminating an object struck by a structure of discriminating an object struck based on the rate-of-change in the moving speed per unit time or the acceleration during a vehicle collision of an impact receiving portion which extends lengthwise along the vehicle width at the front side or the rear side of the vehicle.

DETAILED DESCRIPTION OF THE PREFERRED EMBODIMENTS

Hereinafter, embodiments of the present invention will be described with reference to drawings. First, description will be made as regard to an object struck discrimination system 100 as an embodiment of the "object struck discrimination system" according to the present invention with reference to FIG. 1 and FIG. 2. It should be noted that this embodiment is an object struck discrimination system 100 to be installed in a vehicle 101 as an automobile.

Figure 1:
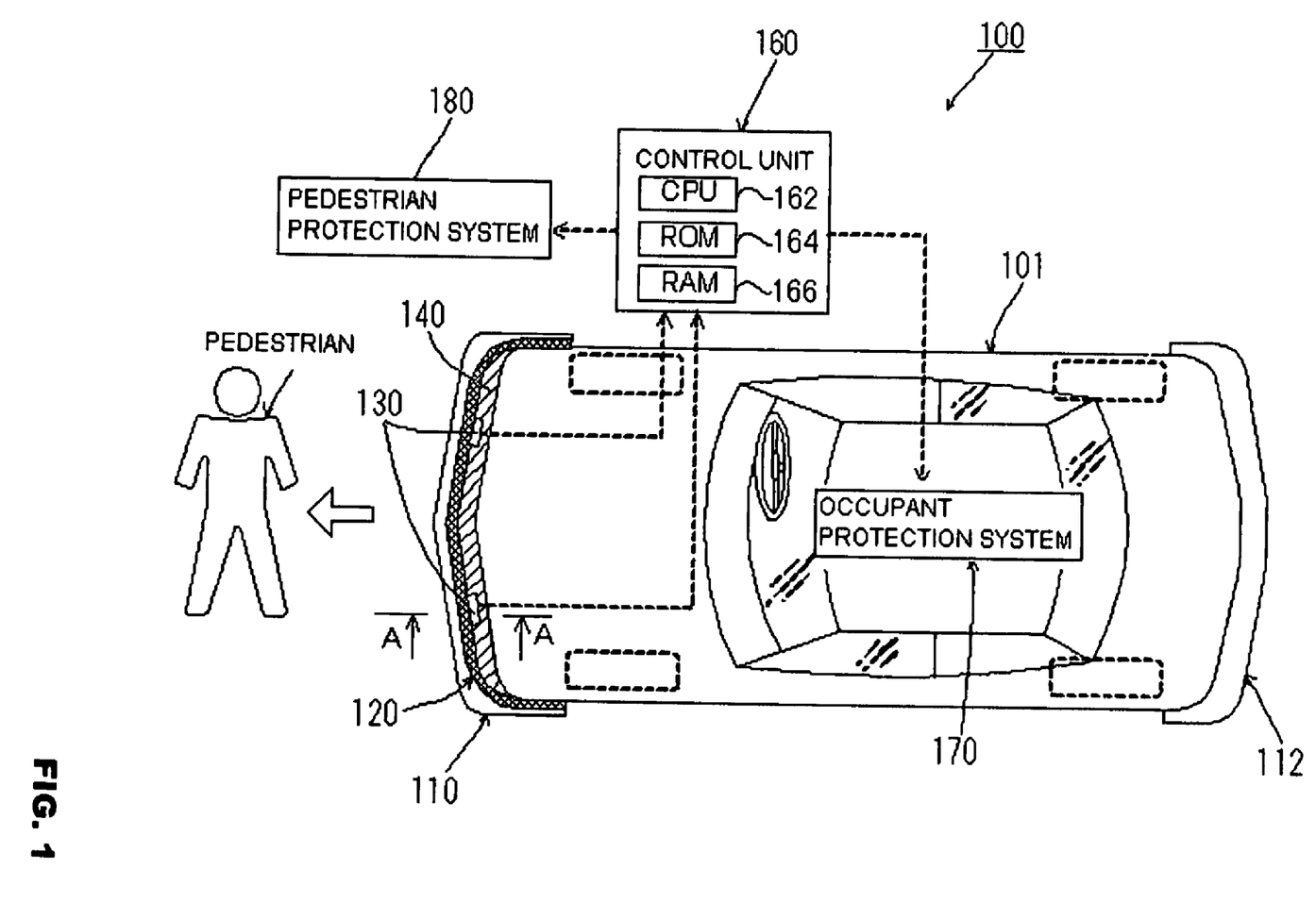
FIG. 1 shows a schematic structure of an object struck discrimination system 100 of an embodiment according to the present invention.

The schematic structure of the object struck discrimination system 100 of the embodiment according to the present invention is shown in FIG. 1. The sectional structure taken along a line A-A of the vehicle 101 in FIG. 1 is shown in FIG. 2.

The vehicle 101 shown in FIG. 1 comprises a front bumper 110, a rear bumper 112, an impact receiving member 120, detection sensors 130, a first absorbing member 140, a second absorbing member 150, a control unit 160, an occupant protection system 170, and a pedestrian protection system 180, and the like. In this embodiment, the object struck discrimination system 100 is mainly composed of the impact receiving member 120, the detection sensor 130, and the control unit 160.

Figure 2:
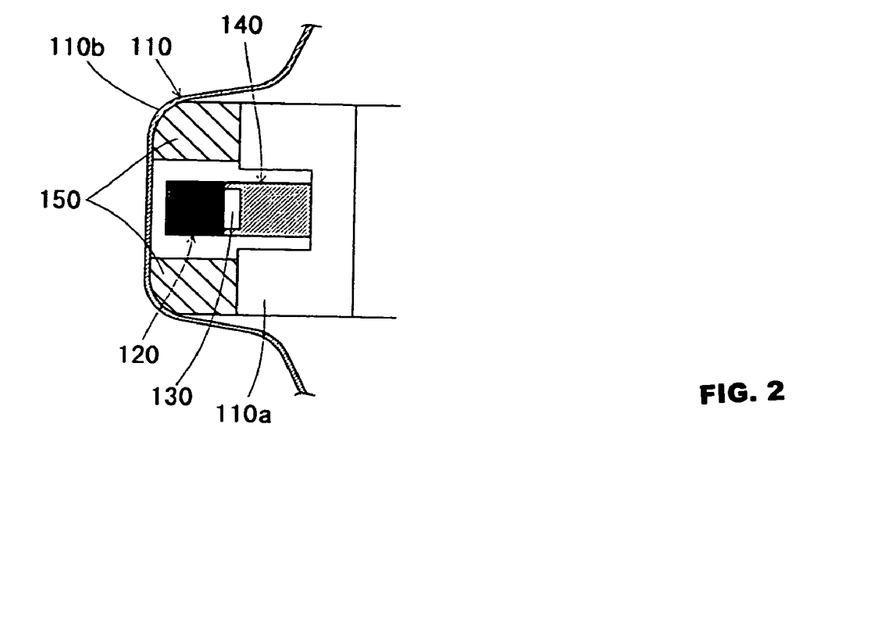
FIG. 2 shows a sectional structure taken along a line A-A of a vehicle 101 in FIG. 1.

As shown in FIG. 2, the front bumper 110 comprises a bumper frame 110a and a bumper cover 110b made of resin covering a front side of the bumper frame 110a. In an area defined by the bumper frame 110a and the bumper cover 110b, the impact receiving member 120, the detection sensors 130, the first absorbing member 140, and the second absorbing member 150 are disposed.

The impact receiving member 120 is a member having a high rigidity extending lengthwise along the front bumper 110. The impact receiving member 120 composes the "impact receiving portion" or the "impact receiving member" of the present invention. The first absorbing member 140 is a member having a low rigidity which is disposed on a rear side of the impact receiving member 120 to absorb impact acting on the impact receiving member 120 during a vehicle collision. The detection sensor 130 is a sensor which is disposed between the impact receiving member 120 and the first absorbing member 140 and at a rear side of the impact receiving member 120 and has a function of detecting information about action such as the moving speed or acceleration of the impact receiving member 120 during a vehicle collision. The detection sensor 130 composes the "moving speed detection means" or the "acceleration detection means" of the present invention. The second absorbing member 150 is a member having a low rigidity which is disposed between the bumper cover 110b and the bumper frame 110a to extend frontward beyond the impact receiving member 120 to absorb the impact acting on the front bumper 110 during a vehicle collision. The second absorbing member 150 composes the "absorbing member" of the present invention.

Reverting to FIG. 1, the control unit 160 comprises a CPU (processing unit) 162 of a known structure, a ROM 164, a RAM 166, and the like and has a function of carrying out respective arithmetic processing and storing processing based on information detected by the detection sensor 130 and a function of outputting control signals to an occupant protection system 170 and a pedestrian protection system 180. In addition, as will be described later in detail, the control unit 160 is a means having a function of deriving a rate of change in the moving speed per unit time and the acceleration of the impact receiving member 120 based on the information detected by the detection sensor 130 and a function of discriminating an object struck. The control unit 160 composes the "moving-speed change rate derivation means" and the "object struck discriminating means" of the present invention.

The occupant protection system 170 is a system having a function of protecting a vehicle occupant during a vehicle collision and may be composed of airbag devices installed in a steering wheel in front of a driver's seat, an instrument panel in front of a passenger's seat, a door trim, a seat, and/or a pillar, and a pretensioner for applying predetermined tension to a seat belt. The control unit 160 controls the actuation of the occupant protection system 170 in such a manner as to achieve occupant protection by the airbag devices during a vehicle collision. The pedestrian protection system 180 is a system having a function of protecting a pedestrian during a vehicle collision and may be composed of a pedestrian protection member which moves toward a pedestrian protection region and the like. As an example, a structure for lifting a vehicle hood as the pedestrian protection member upward when a vehicle strikes a pedestrian or a structure for making a protection pad member as the pedestrian protection member to act on a pedestrian when a vehicle strikes the pedestrian may be employed to absorb the impact on the pedestrian.

Figure 3:
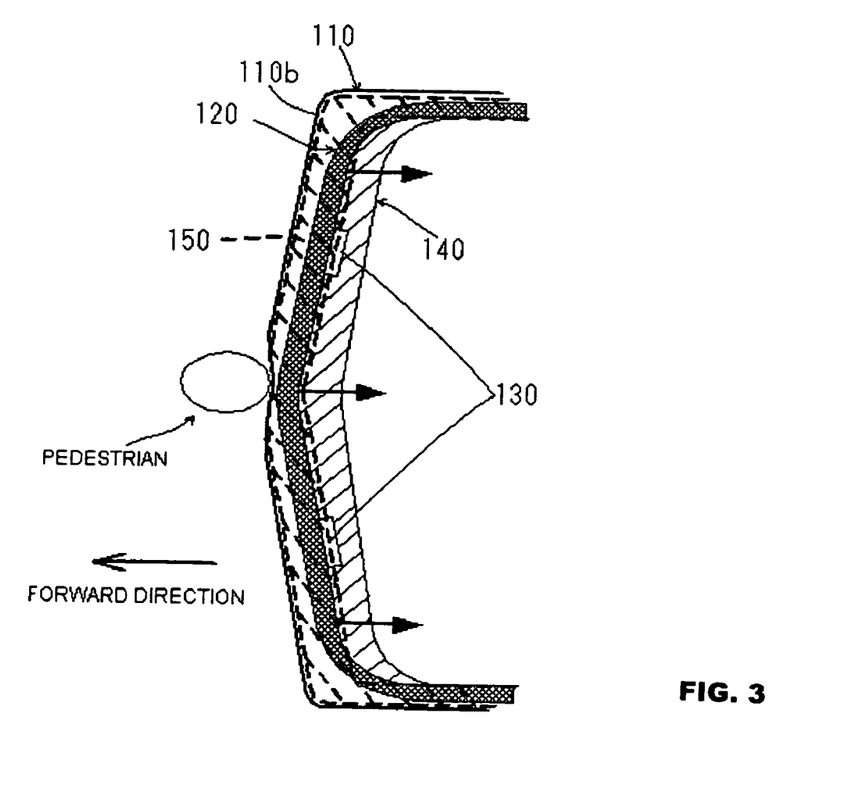
FIG. 3 shows a state of the vehicle when one of legs of a pedestrian is struck by a front bumper 110.
Figure 4:
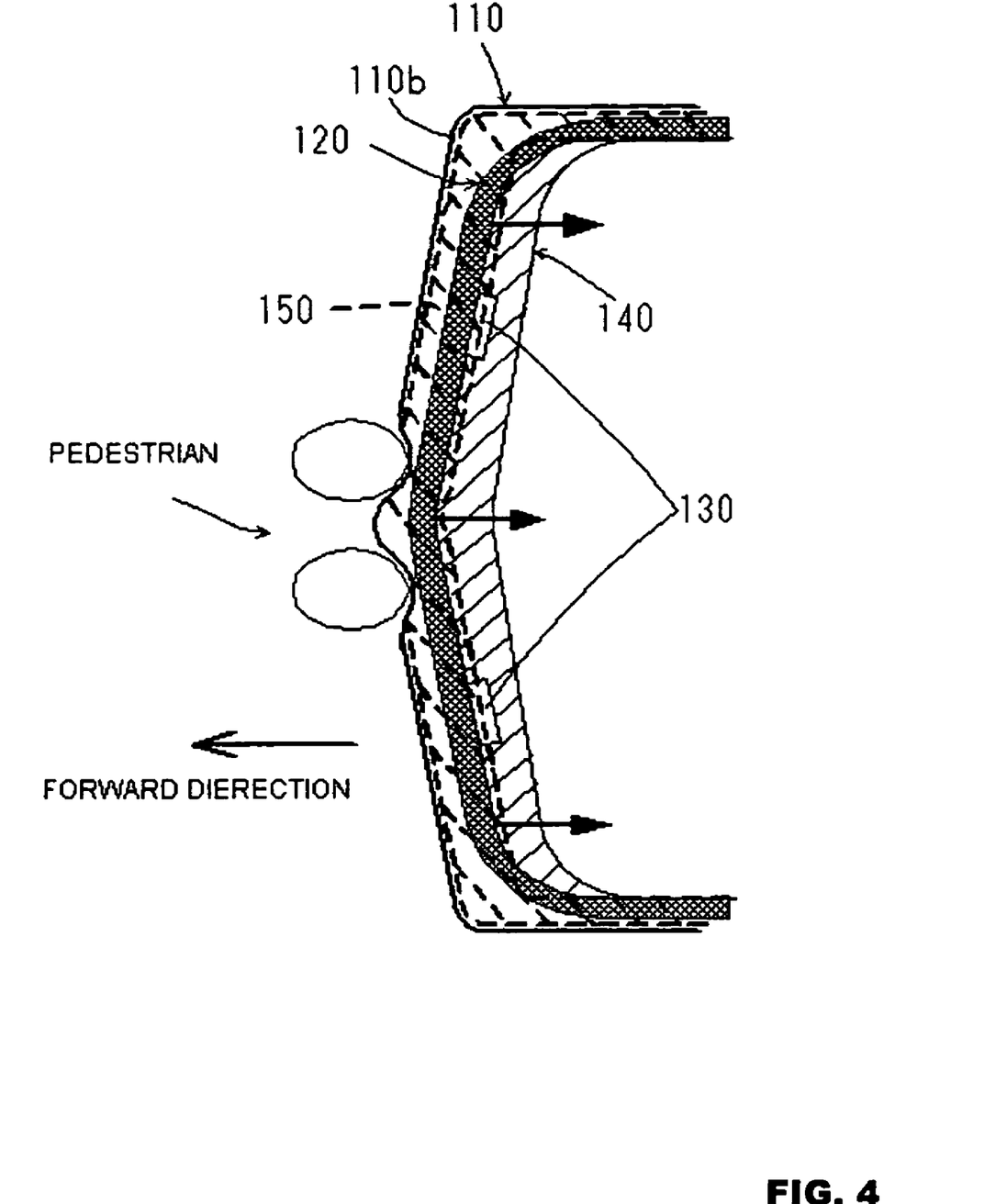
FIG. 4 shows a state of the vehicle when both legs of a pedestrian are struck by the front bumper 110.

The action of the vehicle 101 during a vehicle collision will now be described with reference to FIG. 3 and FIG. 4. FIG. 3 shows a state of the vehicle when one of legs of a pedestrian is struck by the front bumper 110 and FIG. 4 shows a state of the vehicle when both legs of a pedestrian are struck by the front bumper 110.

It is assumed that one or both of legs of a pedestrian is struck by a central portion—as seen in the lateral direction—of the front bumper 110. In this case, as shown in FIG. 3 and FIG. 4, the bumper cover 110b of the front bumper 110 is deformed by striking the leg or legs of the pedestrian and the second absorbing member 150 is deformed with absorbing the impact. The impact is dispersed by the second absorbing member 150 so as to act substantially uniformly on the entire impact receiving member 120. The impact receiving member 120 moves in parallel in a direction of arrows in FIG. 3 and FIG. 4 to have similar behavior in both cases of FIG. 3 and the FIG. 4. According to the structure, the behavior of the impact receiving member 120 becomes similar regardless of the position striking the object on the bumper cover 110b. In this embodiment, the behavior of the impact receiving member 120 is stabilized by the second absorbing member 150 having low rigidity disposed between the bumper cover 110b and the bumper frame 110a.

Hereinafter, "control during vehicle collision" during the vehicle collision will be described with reference to FIG. 5 through FIG. 9. The "control during vehicle collision" of this embodiment is conducted by the control unit 160 having the aforementioned structure.

Figure 5:
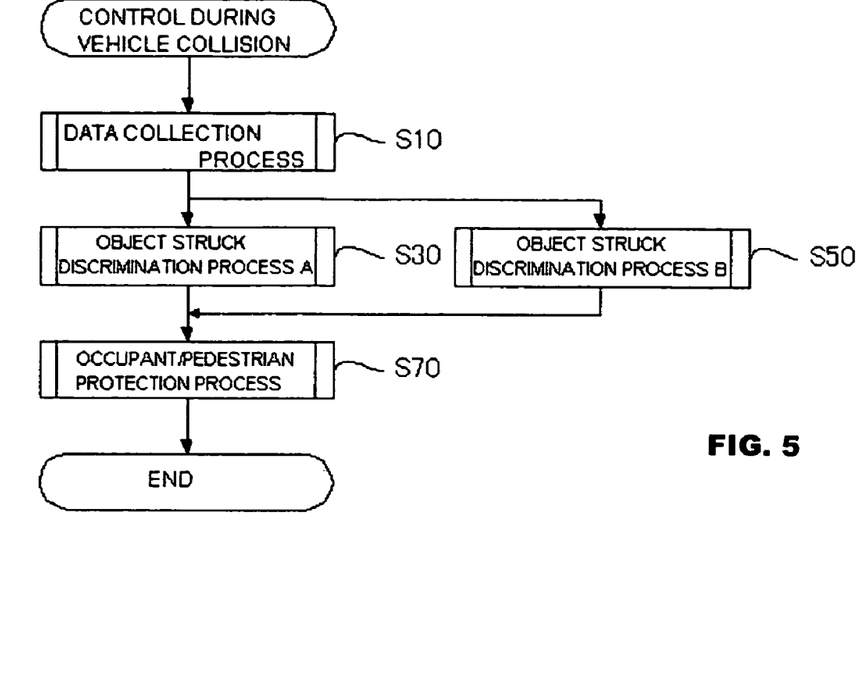
FIG. 5 is a flow chart of "control during vehicle collision".

FIG. 5 shows a flow chart of the "control during vehicle collision". The "control during vehicle collision" of this embodiment is carried out by sequentially conducting the respective steps of the flow chart shown in FIG. 5.

First, in "data collection process" as designated by Step S10 in FIG. 5, data are collected in a vehicle collision test previously conducted.

Then, in "object struck discrimination process A" as designated by Step S30 or "object struck discrimination process B" as designated by Step S50 in FIG. 5, data during actual vehicle collision are compared to the data collected in Step S10 so as to discriminate an object struck. It should be noted that only one of or the both of Step 30 and Step 50 may be previously selected. In "occupant/pedestrian protection process" as designated by step 70 in FIG. 5, an occupant and/or a pedestrian are protected based on the result of the discrimination in Step S30 and/or Step S50.

Figure 6:
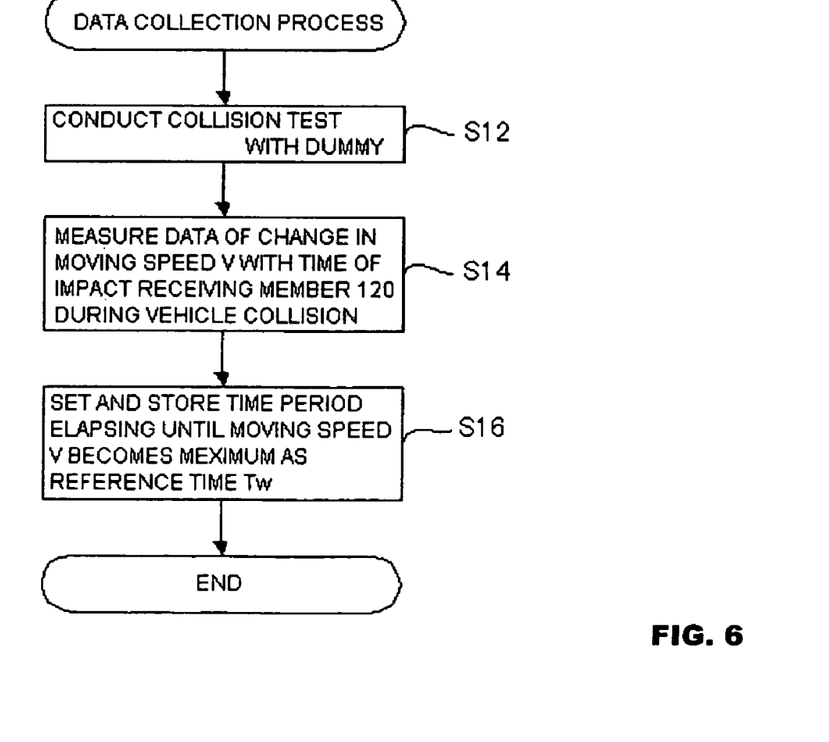
FIG. 6 is a flow chart of "data collection process" in FIG. 5.

Specifically, the "data collection process" as designated by Step S10 in FIG. 5 is carried out by sequentially conducting the respective steps of the flow chart shown in FIG. 6.

First, by Step S12 in FIG. 6, a vehicle collision test is conducted. In the vehicle collision test, a dummy which is an imitation of a human is used as the object struck and a vehicle which is an imitation of the vehicle 101 having the structure shown in FIG. 1 is used so as to conduct the test by bringing the vehicle into collision with the dummy. The dummy corresponds to the "imitated human body" of the present invention. Next, by Step S14 in FIG. 6, data of change in moving speed V with time of the impact receiving member 120 during the vehicle collision are measured. Then, by Step S16 in FIG. 6, the time period elapsing until the moving speed V of the impact receiving member 120 becomes the maximum is set and stored as a reference time Tw. The reference time Tw corresponds to the "reference time from the occurrence of the vehicle collision" of the present invention.

Figure 7:
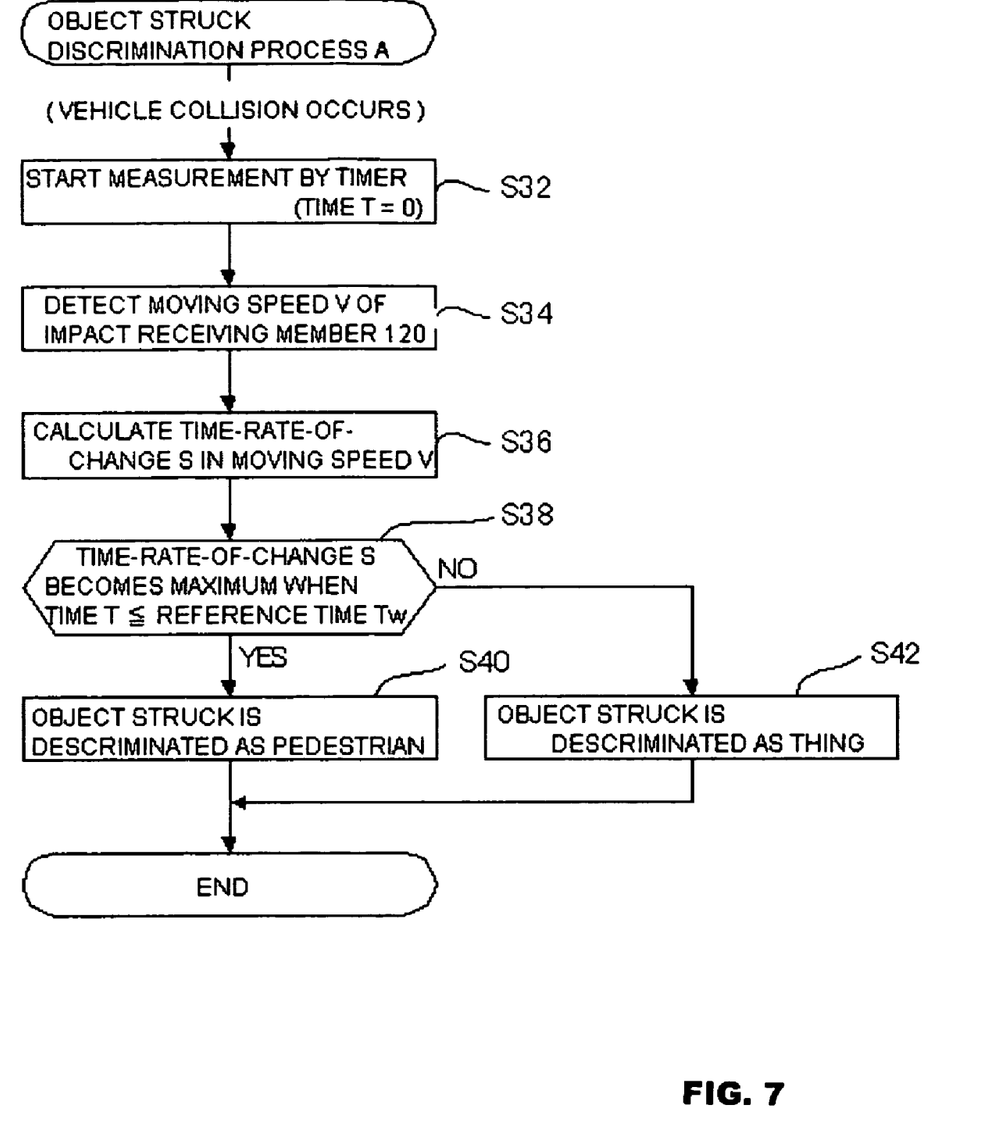
FIG. 7 is a flow chart of "object struck discrimination process A" in FIG. 5.

Specifically, the "object struck discrimination process A" as designated by Step S30 in FIG. 5 is carried out by sequentially conducting the respective steps of the flow chart shown in FIG. 7.

First, by Step S32 in FIG. 7, measurement by a timer is started at the occurrence of the vehicle collision. The time T (elapsed time) at the occurrence of the vehicle collision is set as 0 (zero). It should be noted that the occurrence of the vehicle collision is detected by an acceleration sensor capable of detecting acceleration acting on the vehicle in three axial directions (X-axis, Y-axis, Z-axis). Next, by Step S34 in FIG. 7, the moving speed V of the impact receiving member 120 during the vehicle collision is detected. To detect the moving speed, a speed sensor is used as a detection sensor 130. Then, by Step S36 in FIG. 7, a time-rate-of-change S in the moving speed V, that is, a rate of change in the moving speed V per unit time is calculated successively and the process proceeds to Step 38. If it is determined that the time-rate-of-change S calculated by Step S36 becomes the maximum before the time T measured by the timer reaches the predetermined reference time Tw ("YES" in Step S38), the object struck is discriminated as a pedestrian (Step S40). If it is determined that it is not the aforementioned case ("NO" in Step S38), the object struck is discriminated as a thing (Step S42). As described above, in the "object struck discrimination process A" in this embodiment and "object struck discrimination process B" as will be described later, the actual discrimination of the object struck is conducted according to the determination of whether the object struck is a person or not.

Figure 8:
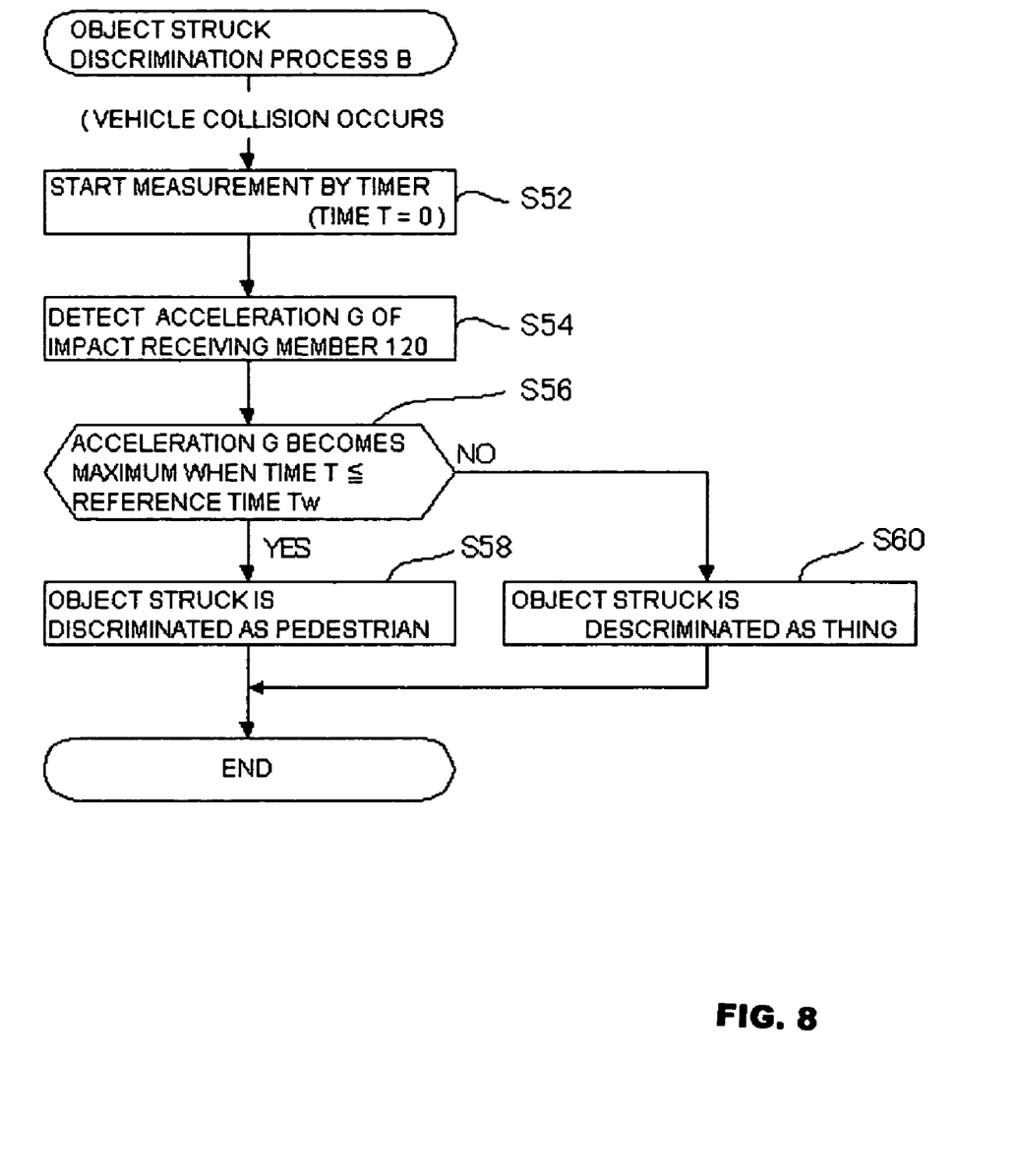
FIG. 8 is a flow chart of "object struck discrimination process B" in FIG. 5.

Specifically, the "object struck discrimination process B" as designated by Step S50 in FIG. 5 is carried out by sequentially conducting the respective steps of the flow chart shown in FIG. 8.

First, by Step S52 in FIG. 8, measurement by a timer is started at the occurrence of the vehicle collision. The time T (elapsed time) at the occurrence of the vehicle collision is set as 0 (zero). It should be noted that the occurrence of the vehicle collision is detected by an acceleration sensor capable of detecting acceleration acting on the vehicle in three axial directions (X-axis, Y-axis, Z-axis). Next, by Step S54 in FIG. 8, the acceleration G of the impact receiving member 120 during the vehicle collision is detected. To detect the acceleration G, an acceleration sensor is used as a detection sensor 130. If it is determined that the acceleration detected in Step S54 becomes the maximum before the time T measured by the timer reaches the predetermined reference time Tw ("YES" in Step S56), the object struck is discriminated as a pedestrian (Step S58). If it is determined that it is not the aforementioned case ("NO" in Step S56), the object struck is discriminated as a thing (Step S60).

Figure 9:
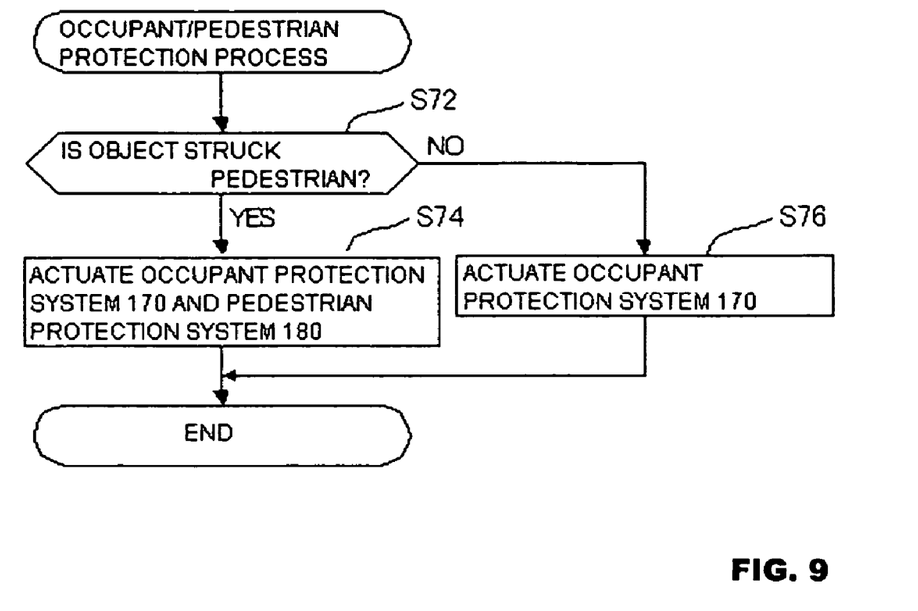
FIG. 9 is a flow chart of "occupant/pedestrian protection process" in FIG. 5.

Specifically, the "occupant/pedestrian protection process" as designated by Step S70 in FIG. 5 is carried out by sequentially conducting the respective steps of the flow chart shown in FIG. 9.

In Step S72 in FIG. 9, based on the result in Step S40 or S42 in FIG. 7 or the result in Step S58 or S60 in FIG. 8, the process proceeds to Step 74 if the object struck is a pedestrian and proceeds to Step 76 if not (the object struck is a thing). In Step S74, an actuation control signal is outputted to the occupant protection system 170 and the pedestrian protection system 180 to actuate the occupant protection system 170 and the pedestrian protection system 180, while in Step S76, an actuation control signal is outputted to the occupant protection system 170 to actuate the occupant protection system 170. When the actuation signal is received, the airbags of the airbag devices composing the occupant protection system 170 are developed and inflated into the occupant protection region, while the pedestrian protection member composing the pedestrian protection system 180 moves toward the pedestrian protection region. Accordingly, thorough protection of the occupant and the pedestrian during the vehicle collision is achieved.

As mentioned above, the occupant protection system 170 and the pedestrian protection system 180 of this embodiment are actuated to protect the occupant and the pedestrian according to the result of discrimination of the object struck during the vehicle collision and correspond to the "protection system" of the present invention. Alternatively, the "protection system" of the present invention may be composed of a combination of the object struck discrimination system 100 with the occupant protection system 170 and the pedestrian protection system 180.

As described above, according to this embodiment, the discrimination of whether the object struck is a person (pedestrian) is made according to the behavior of the impact receiving member 120 during the vehicle collision. Therefore, the accuracy of discrimination of whether the object struck is a person can be increased regardless of the position striking the person on the impact receiving member 120 during the vehicle collision. Since the acceleration detected by the detection sensor 130 is directly used for discrimination of the object struck, a working effect of simplifying a series of processes for discriminating the object struck from the detection of behavior of the impact receiving member 120 can be achieved.

According to this embodiment, it is possible to conducting the quick discrimination of an object struck within a time period shorter than the reference elapsed time Tw. Since the reference elapsed time Tw is set according to the vehicle collision test previously conducted with a dummy, increased reliability of discriminating that the object struck is a person is obtained. The result of the discrimination can be used for controlling the pedestrian protection system 180 for providing thorough protection of the person (pedestrian). The structure capable of conducting the quick discrimination of the object struck allows relatively slow action of the occupant protection system 170. For example, low-capacity inflators for the airbag devices composing the occupant protection system 170 can be used. In addition, it is possible to control the internal pressure of the airbags and/or the winding amount of a pretensioner according to the severity of the vehicle collision.

Further, according to this embodiment, the impact received by the impact receiving member 120 having high rigidity during the vehicle collision reflects the entirety of the impact receiving member 120. Therefore, the discrimination accuracy for discriminating the object struck can be increased regardless of the position striking the object on the impact receiving portion extending in the vehicle width direction.

Further, according to this embodiment, the second absorbing member 150 is disposed to extend frontward beyond the impact receiving member 120, the impact acting on the vehicle body is uniformly applied to the impact receiving member 120 in the dispersed state. Therefore, the vehicle collision can securely reflect to the behavior of the impact receiving member 120, thereby further increasing the discrimination accuracy for discriminating the object struck.

The present invention is not limited to the aforementioned embodiment and various applications and modifications may be made. For example, the following respective embodiments based on the aforementioned embodiment may be carried out.

Though the aforementioned embodiment has been described with regard to the structure that the detection sensor 130 is provided on the rear side of the impact receiving member 120 to detect the behavior of the impact receiving member 120 during the vehicle collision, the detection sensor 130 may be provided on the bumper cover 110b extending lengthwise along the vehicle width similarly to the impact receiving member 120 so as to detect the behavior of the bumper cover 110b during the vehicle collision in the present invention.

Figure 10:
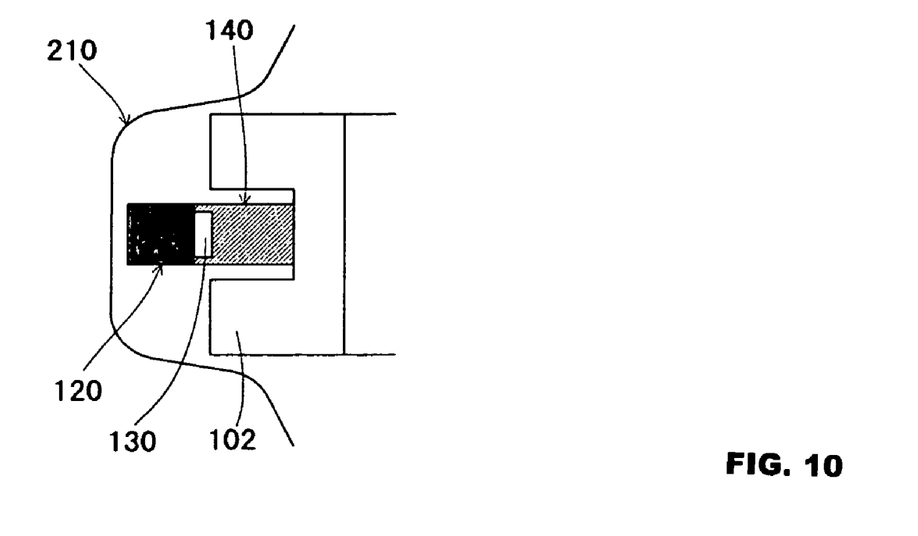
FIG. 10 shows a sectional structure of a front bumper 210 in another embodiment.

Though the aforementioned embodiment has been described with regard to a case that the structure of the front bumper 110 as shown in FIG. 2 is used, a front bumper 210 in which no second absorbing member 150 is disposed between the bumper cover and the frame 102 as shown in FIG. 10 may be employed in the present invention.

Though the aforementioned embodiment has been described with regard to a case of actually discriminating an object struck based on the discrimination of whether the object struck is a person or the like, it can be structured to directly discriminate whether the object struck is a person or a specific object in the present invention.

Though the aforementioned embodiment has been described with regard to a case of discriminating an object struck in a frontal collision of a vehicle, the present invention can be adopted to a technology for discriminating an object struck in a retral collision of a vehicle.

Though the aforementioned embodiment has been described with regard to a case of collecting data by conducting a vehicle collision test with a dummy, data may be collected by conducting a collision simulation on the assumption of a situation with a person.

Though the aforementioned embodiment has been described with regard to the structure of the object struck discrimination system to be installed in an automobile, the present invention can be adopted to various vehicles other than automobile such as a train, boat and ship.

What is claimed is:

1. A vehicle including a discrimination system for determining the type of object struck by the vehicle, the vehicle comprising:
    a vehicle body including a front bumper, a rear bumper, and a pair of opposite lateral vehicle sides spaced by a lateral width therebetween;
    an elongate, high rigidity impact receiving member extending continuously across at least half of the vehicle body width in a lateral direction and being mounted at the front or rear bumper and configured for generally uniform one-dimensional travel across the lateral extent of the elongate, rigid impact receiving member relative to the vehicle in a generally fore-and-aft direction extending orthogonal to the lateral direction during a collision with an object;
    a sensor sized to extend for less than half the length of the impact receiving member for being positioned at a discrete lateral position behind the elongate, high rigidity impact receiving member the sensor being configured to detect a moving speed or acceleration of the elongate, high rigidity impact receiving member during the collision;
    a controller that determines the type of object struck by the vehicle based on whether a predetermined maximum threshold level relating to acceleration or rate-of-change of the moving speed is reached in a predetermined duration from impact with the object; and
    a resilient absorbing member disposed inwardly of the elongate, high rigidity impact receiving member extending continuously along at least half of the vehicle width and configured to resiliently flex in response to a collision to facilitate the movement of the elongate, rigid impact receiving member in the fore-and-aft direction relative to the lateral direction.

2. The vehicle of claim 1 wherein the controller has memory that stores the predetermined maximum threshold level obtained from a prior vehicle collision test.

3. The vehicle of claim 1 including an absorbing member disposed outwardly of the rigid impact receiving member for substantially uniformly distributing impact forces during a collision to the rigid impact receiving member.

4. The vehicle of claim 1 including a pedestrian protection system with the controller actuating the pedestrian protection system based on the type of object struck by the vehicle as determined by the controller.

5. A vehicle including a struck object discrimination system, the vehicle comprising:
   a vehicle body including a front bumper, a rear bumper, and a pair of opposite lateral sides spaced by a lateral width;
   a generally U-shaped rigid impact member comprising:
      an elongate, high rigidity impact receiving portion extending continuously across the vehicle body in a lateral direction and being mounted at the front bumper or the rear bumper of the vehicle for receiving impact forces from a forward or rearward collision with the struck object, configured so that the entire elongate, high rigidity impact receiving portion moves generally uniformly relative to the vehicle in a fore-and-aft direction that extends generally orthogonal to the lateral direction;
      side members extending rearwardly from opposite lateral ends of the elongate, high rigidity impact receiving portion to shift adjacent to the lateral sides of the vehicle body during movement of the rigid impact member in the fore-and-aft direction during the collision;
   a sensor, mounted behind the high rigidity impact receiving portion, that detects a moving speed or acceleration of the generally orthogonal motion of the elongate, high rigidity impact receiving portion during a collision with the object; and
   a controller that discriminates the type of struck object based on the detected acceleration or rate of change of the moving speed of the elongate, high rigidity impact receiving portion.

6. The vehicle of claim 5 including a shock absorbing member having at least a portion thereof positioned in front of the elongate, high rigidity impact receiving portion and being configured to distribute impact forces during the collision with the object substantially uniformly along the lateral width of the elongate, high rigidity impact receiving portion.

7. The vehicle of claim 5 wherein the sensor is a speed sensor, the controller determines a rate-of-change of the detected speed of the elongate, high rigidity impact receiving portion, and the controller compares a maximum rate-of-change against a predetermined maximum rate-of-change of speed for struck object discrimination.

8. The vehicle of claim 7 including a timer that measures elapsed time from occurrence of the vehicle collision, and the controller compares the elapsed time against a predetermined reference time corresponding to time elapsed from collision until the predetermined maximum rate-of-change was reached in a prior collision test.

9. The vehicle of claim 5 wherein the sensor is an acceleration sensor, and the controller compares a maximum acceleration of the elongate, high rigidity impact receiving portion against a predetermined maximum acceleration for struck object discrimination.

10. The vehicle of claim 9 including a timer that measures elapsed time from occurrence of the vehicle collision, and the controller compares the elapsed time against a predetermined reference time corresponding to time elapsed from collision until the predetermined maximum acceleration was reached in a prior collision test.

11. A struck object discrimination system comprising:
    an elongate, high rigidity impact receiving portion extending continuously across at least half of a vehicle width in a lateral direction and being mounted at a front side or a rear side of the vehicle and being configured so that during a forward or rearward collision with a struck object, the entire elongate, high rigidity impact receiving portion moves relative to the vehicle in a generally fore-and-aft direction extending orthogonal to the lateral direction;
    a first shock absorbing member with at least a portion thereof disposed in front of the elongate, high rigidity impact receiving portion configured to receive impact forces during a collision with a struck object and uniformly distributing the impact forces generally uniformly along the lateral width of the elongate, high rigidity impact receiving portion;
    a second elongate, resilient shock absorbing member extending continuously across the vehicle in the lateral direction and being positioned behind the elongate, high rigidity impact receiving portion along at least half of the vehicle width and configured to facilitate substantially uniform movement of the entire elongate, high rigidity impact receiving portion in the fore-and-aft direction during a collision with the struck object;
    a sensor for detecting acceleration or moving speed of the elongate, high rigidity impact receiving portion during the collision with the struck object; and
    a controller that discriminates the struck object using the detected acceleration or by calculating a time rate-of change of the detected moving speed.

12. The struck object discrimination system of claim 11 wherein the controller has a memory storing a reference elapsed time, and
    a timer that is started at collision occurrence with the controller comparing the time elapsed from collision occurrence against the reference elapsed time when a maximum level of the acceleration or time rate-of change of the moving speed is reached.

13. The struck object discrimination system of claim 12 including a pedestrian protection system of the vehicle, and the controller actuates the pedestrian protection system if the time elapsed to reaching the maximum level of the acceleration or time rate-of change of the moving speed is less than the reference elapsed time.

14. A vehicle including a discrimination system for determining the type of object struck by the vehicle, the vehicle comprising:
    a vehicle body including a front bumper, a rear bumper, and a pair of opposite lateral vehicle sides spaced by a lateral width therebetween;
    an elongate, high rigidity impact receiving member extending continuously across at least half of the vehicle body width in a lateral direction and being mounted at the front or rear bumper and configured for generally uniform one-dimensional travel across the lateral extent of the elongate, rigid impact receiving member relative to the vehicle in a generally fore-and-aft direction extending orthogonal to the lateral direction during a collision with an object;

a sensor sized to extend for less than half the length of the impact receiving member for being positioned at a discrete lateral position behind the elongate, high rigidity impact receiving member the sensor being configured to detect a moving speed or acceleration of the elongate, high rigidity receiving member during the collision;

a controller that determines the type of object struck by the vehicle based on whether a predetermined maximum threshold level relating to acceleration or rate-of-change of the moving speed is reached in a predetermined duration from impact with the object and a plurality of side members extending rearwardly from the elongate, high rigidity impact receiving member to shift adjacent to the lateral sides of the vehicle body during the collision.

15. The struck object discrimination system of claim 5, further comprising an elongate, resilient absorbing member located inwardly of the elongate, high rigidity impact receiving member extending continuously along at least half of the vehicle width for resiliently flexing inwardly to facilitate movement of the elongate, high rigidity impact receiving member toward the vehicle during a collision.

16. The struck object discrimination system of claim 15, further comprising an absorbing member located outwardly of the elongate, high rigidity impact receiving member for absorbing impact from a collision and distributing the impact along the entire lateral width of the elongate, rigid impact receiving member to facilitate generally uniform movement of the elongate, high rigidity impact receiving member toward the vehicle in a direction generally orthogonal to the lateral direction during a collision.

17. The struck object discrimination system of claim 11, further comprising a pair of side members extending generally rearwardly from the lateral ends of the elongate, high rigidity impact receiving portion to shift adjacent to opposite lateral sides of the vehicle and being configured to restrict the elongate, high rigidity impact receiving portion from moving in directions other than orthogonal to the lateral direction during the collision with the struck object.

* * * * *